United States Patent [19]
Maeda et al.

[11] Patent Number: 6,152,534
[45] Date of Patent: Nov. 28, 2000

[54] SEAT HAVING SEATING FACE MADE OF SHEET RESILIENT MATERIAL

[75] Inventors: Minoru Maeda; Tomomi Shoji; Tsutomu Matsuzaki; Naohiro Takahashi, all of Tochigi-ken; Masashi Ishii; Tsutomu Ao, both of Saitama, all of Japan

[73] Assignees: TS Tech Co., Ltd.; Honda Giken Kogyo Kabushiki Kaisha, both of Japan

[21] Appl. No.: 09/271,312

[22] Filed: Mar. 17, 1999

[30] Foreign Application Priority Data

Mar. 19, 1998 [JP] Japan .................................. 10-090916

[51] Int. Cl.⁷ .................................................. A47C 31/02
[52] U.S. Cl. ................................. 297/452.56; 297/218.3; 297/452.59
[58] Field of Search ............................ 297/218.1, 218.3, 297/218.4, 218.5, 228.13, 452.47, 452.56, 452.59

[56] References Cited

U.S. PATENT DOCUMENTS

| | | |
|---|---|---|
| 2,012,042 | 8/1935 | Gerlofson et al. ............. 297/452.47 X |
| 2,371,954 | 3/1945 | Cunningham ................... 297/452.56 X |
| 2,878,860 | 3/1959 | Brattrud .............................. 297/452.56 |
| 3,137,523 | 6/1964 | Karner ........................... 297/452.47 X |
| 4,834,458 | 5/1989 | Izumida et al. ................. 297/452.56 X |
| 4,869,554 | 9/1989 | Abu-Isa et al. ..................... 297/452.56 |
| 5,533,789 | 7/1996 | McLarty, III et al. . |
| 5,597,200 | 1/1997 | Gregory et al. .................... 297/452.47 |

*Primary Examiner*—Peter R. Brown
*Attorney, Agent, or Firm*—Dann, Dorfman, Herrell and Skillman, P.C.

[57] ABSTRACT

A trim cover 5 capable of vending and deforming together with the sheet resilient material by pressure of a body of a sitting passenger is stretched within the frame of the frame body such as to face a front surface side of the sheet resilient material 2. With this structure, it is possible to suppress the air from an air conditioner in a vehicle from directly flowing from the seating face to a sitting passenger, thereby preventing the excessive effect of the air conditioner in the vehicle. Further, the design of the entire seat can be enhanced.

15 Claims, 4 Drawing Sheets

ID FOR A SHEET RESILIENT MATERIAL

BACKGROUND OF THE INVENTION

FIELD OF THE INVENTION

The present invention relates to an improvement of a seat having a seating face made of breathable sheet resilient material.

THE PRIOR ART

Conventionally, a seat forming a seating face made of breathable sheet resilient material has already been proposed (U.S. Pat. No. 5,013,089, U.S. Pat. No. 5,533,789 and Japanese Patent Application Laid-open NO.H8-507935).

The seat is of course superior in cushion properties, the breathability can be applied to the seating face through the seat resilient material, the seat can be different from a normal seat in design due to the net-like outward appearance of the sheet resilient material, a pad member, a spring member and the like which are necessary to form a normal seating face can be omitted, the weight can be lightened, the space efficiency is superior due to the thin thickness of the sheet resilient material and thus, the seat is preferable.

However, in the above-described seat, since the seating face is formed of the net-like sheet resilient material, if the seat is applied to a vehicle seat, there is a problem that the effect of an air conditioner in the vehicle is too high. Further, in the case of a seat back, since the sheet resilient material directly faces the rear side, the sheet resilient material might hit against a knee of a passenger on the rear seat.

SUMMARY OF THE INVENTION

It is an object of the present invention to provide a seat having a seating face made of sheet resilient material in which the merit of a sheet resilient material forming the seating face, the excessive effect of an air conditioner in the vehicle is prevented, and a degree of design is enhanced.

In addition to the above object, it is another object of the invention to provide a seat having a seating face made of sheet resilient material capable of enhancing the supporting property of a passenger and solving the problem that the seat may hit a knee of the a rear seat passenger.

To achieve the above objects, according to a first aspect of the present invention, there is provided a seat having a seating face made of sheet resilient material in which the seating face is formed by stretching a breathable sheet resilient material within a substantially quadrilateral frame body as a seat frame, wherein a trim cover capable of bending and deforming together with the sheet resilient material by pressure of a body of a sitting passenger is stretched within the frame of the frame body such as to face a front surface side of the sheet resilient material.

With this feature, it is possible to suppress the air from an air conditioner in a vehicle from directly flowing from the seating face to a sitting passenger, thereby preventing the excessive effect of the air conditioner in the vehicle. Further, since the trim cover is disposed at the front surface side, the design of the entire seat can be enhanced.

According to a second aspect of the invention, the trim cover has breathability.

With this feature, it is possible to suppress the air from an air conditioner in a vehicle from directly flowing from the seating face to the sitting passenger, the moderate breathability can be kept and the design of the entire seat can be enhanced.

According to a third aspect of the invention, the trim cover is formed of skin material and pad material layered on each other.

With this feature, the moderate cushion property can be obtained by the pad material and the sitting passenger can be supported excellently. Further, even if the trim cover hit a knee of a passenger on the rear seat, it is possible to prevent this from directly acting to a passenger on the front seat, and to buffer the hit against the passenger on the rear seat.

DETAILED DESCRIPTION OF THE INVENTION

Figure 1:
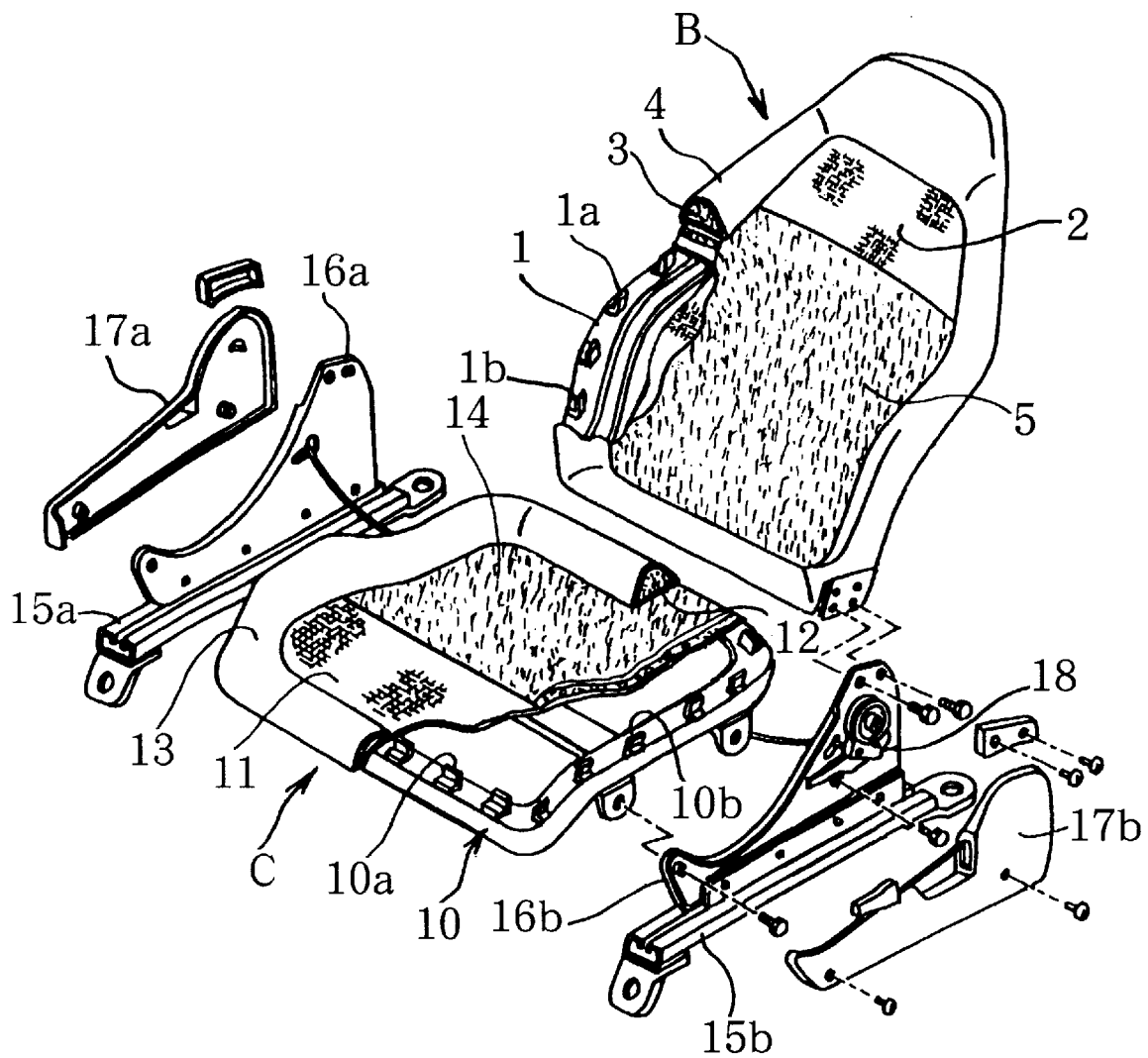
FIG. 1 is a development perspective view of the entire seat having a seating face made of sheet resilient material according to the present invention.

An embodiment of the present invention will be explained with reference to the accompanying drawings below. As shown in FIG. 1, the illustrated embodiment is applied for assembling a seat back B and a seat cushion C into a vehicle seat. Each of the seat back B and the seat cushion C of the vehicle seat is assembled from a substantially quadrilateral frame-like seat frame 1, 10, a sheet resilient material 2, 11, forming a seating face, a pad member 3, 12, forming a largely rising bank, a skin material 4, 13, covering the pad member 3, 12, and a trim cover 5, 14, stretched such as to cover a front surface of the sheet resilient material 2, 11.

Figure 2:
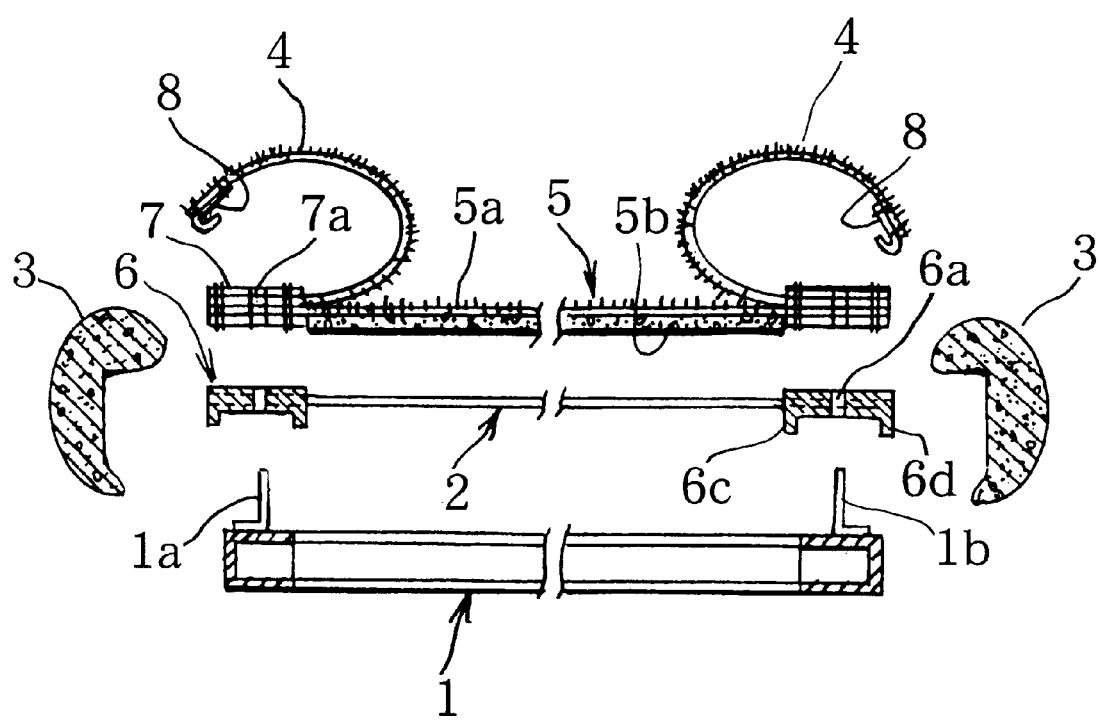
FIG. 2 is a sectional view of a developed seat back of the seat.
Figure 3:
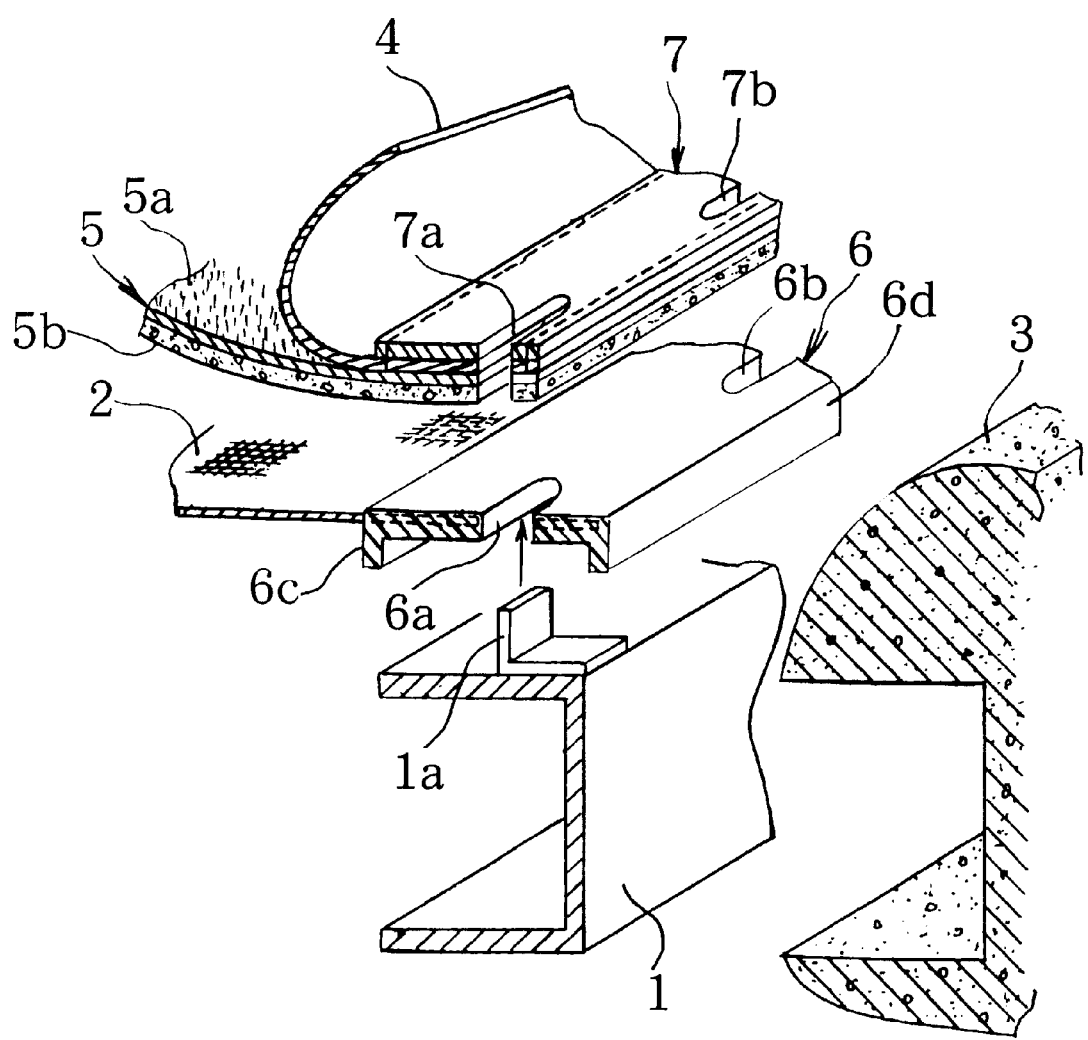
FIG. 3 is an enlarged partial sectional view of the developed seat back of the seat.
Figure 4:
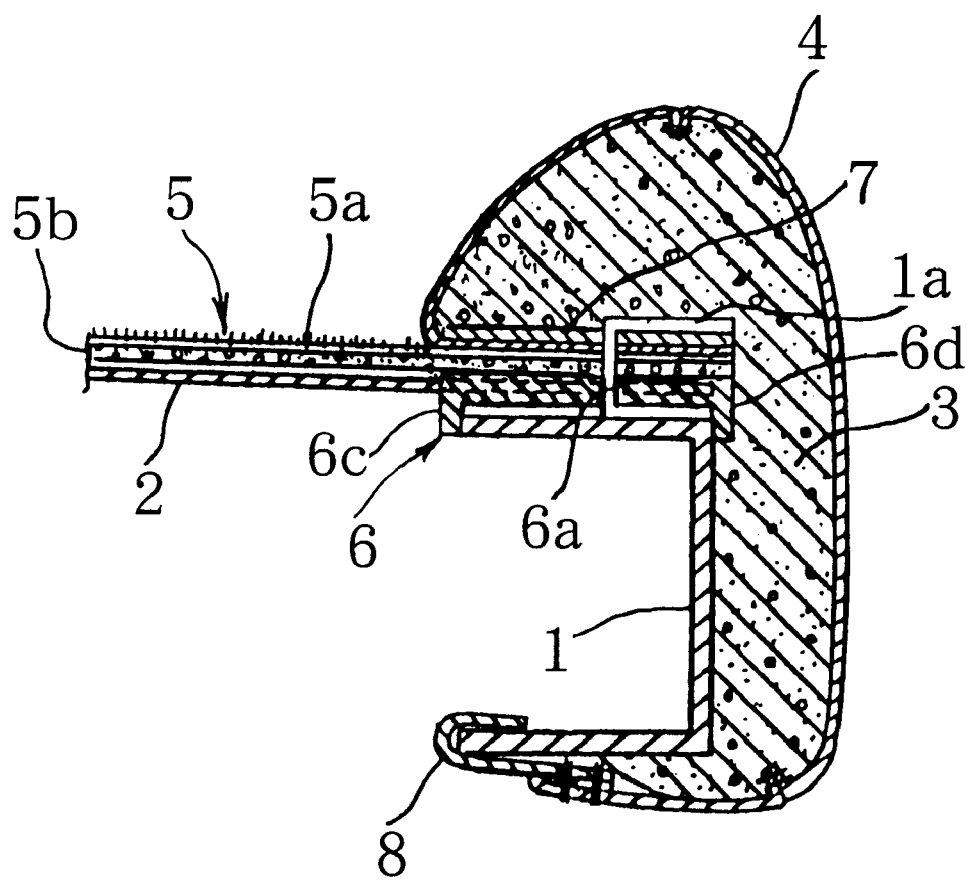
FIG. 4 is an enlarged partial sectional view of the assembled seat back of the seat.

The concrete structure will be explained based on the seat back B. As shown in FIGS. 2 and 3, a metal frame having U-shaped cross section whose inner side is opened is used as the seat back frame 1. The seat back frame 1 is bent in the axial direction such that each of sides forming the substantially quadrilateral shape of the seat back frame 1 fits to a contour of a sitting passenger.

The seat back frame 1 is provided with a plurality of hanging pawls 1a, 1b . . . used for fixing around the sheet resilient material 2 and the end of the skin material. The hanging pawls 1a, 1b . . . are so-called "retainers", and they are mounted and fixed near the outer peripheral edges of the seat back frame 1 by welding and fixing, at a predetermined distance from one another, on a frame surface on which the sheet resilient material 2 is stretched.

A cloth having elasticity and breathability is used as the sheet resilient material 2. For example, a cloth formed of a plurality of elastomer monofilaments woven by a plurality of strands such as fiber yarn used for interior cloth, a cloth or a knit to which elasticity and breathability are applied by weaving or knitting 1000 to 4000-denier elastomer monofilament to the warp or the weft can be used as the sheet resilient material 2.

The sheet resilient material 2 is integrally formed around its periphery with a resin plate 6 made of PET, PP or the like. The resin plate 6 is embedded thick around the edge of the sheet resilient material 2 and integrally formed by insert forming such that the resin plate 6 supports the sheet resilient material 2 from its periphery in a stretching manner.

The resin plate 6 is provided with a plurality of slits 6a, 6b . . . located in correspondence with the hanging pawls 1a, 1b . . . of the seat back frame 1. The slits 6a, 6b . . . are formed as elongated holes and formed concurrently with the resin plate 6 such that the slits are arranged in a longitudinal direction of the plate surface. The resin plate 6 is integrally formed along its opposite side edges with rising resin flanges 6c, 6d engaging the side surface from the frame surface of the seat back frame 1.

The pad member 3 is a cushion foam body such as foaming urethane, and is provided with a recess in which a front surface, side surface and a back surface of the seat back frame 1 are fitted and fixed from out side, and is formed into a predetermined cubic shape. The pad member 3 may be individually formed for each side of the seat back frame 1, or the entire pad member 3 may be continuously and integrally formed in the frame shape of the seat back frame 1. The front side of the pad member 3 largely rises such as to assemble the bank having excellent holding property and especially, a portion thereof from its intermediate portion to the lower portion of both the sides largely rises, and the upper portion largely rises as a head rest portion.

As the skin material 4, any material such as a genuine real leather, a synthetic leather or fabric can be used. The entire skin material 4 may be sewn and formed into a continuous integral material such that the pad member 3 assembled to each side of the seat back frame 1 is enveloped from the outer side thereof by a substantially C-shaped cross section whose inner side is opened.

A reinforcing cord 7, that is, a so-called "trim cord" is sewn to the skin material 4 along an end wound and stopped at the front surface side of the seat back frame 1. The reinforcing cord 7 is provided with a plurality of slits 7a, 7b . . . located in alignment with the slits 6a, 6b . . . of the resin plate 6 along a longitudinal direction. A hard resin hook 8 is sewn along the other end of the skin material 4 for hanging on a flange portion of the seat back frame 1.

As the trim cover 5, a material capable of suppressing the breathability such as a genuine real leather or a synthetic leather can be used. For example, the material capable of suppressing the breathability can be used as a skin material 5b, and the pad material 5a such as a foaming urethane or cotton cloth can be layered thereon. Further, as the trim cover 5, the pad material 5b such as a foaming urethane (skeleton: trademark) having a high breathability such as a cotton cloth can be layered on the skin material 5a such as a fabric to obtain the breathability.

The trim cover 5 faces the sheet resilient material 2 and is stretched between the sides of the frame 1 from the front surface side. The trim cover 5 may be stretched over the reinforcing cord 7 by sewing the end of the trim cover 5 and the reinforcing cord 7 of the skin material 4. As to the area of the trim cover 5, the cover can be faced with the sheet resilient material 2 over substantially the entire surface thereof, or in the case of the seat back B, the cover 5 can be stretched over the lower portion only except the upper portion as shown in FIG. 1 so that the breathability is kept by the sheet resilient material 2.

In order to assemble each of the above-described members into the seat back B, the rising flanges 6c and 6d of the resin plate 6 are first brought into engagement with the opposite sides of the seat back frame 1, and the resin plate 6 of the sheet resilient material 2 is held and disposed on the frame surface of the seat back frame 1. At that time, the hanging pawls 1a, 1b . . . of the seat back frame 1 are fitted into the slits 6a, 6b . . . of the resin plate 6.

Next, the reinforcing cord 7 is superposed on the resin plate 6 of the sheet resilient material 2, the tip ends of the hanging pawls 1a, 1b . . . projecting from the slits 6a, 6b of the resin plate 6 are fitted into the aligned slits 7a, 7b . . . of the reinforcing cord 7, the projecting end side of the pawls are bent outward of the seat back frame 1, and the resin plate 6 and the reinforcing cord 7 are fastened and fixed together with the front surface side of the seat back frame 1. With this operation, the trim cover 5 can be stretched within the frame of the seat back frame 1 together with the sheet resilient material 2 forming the seating face, and one end of the skin material 4 can be stopped and fixed to the front surface side of the seat back frame 1.

After the one end of the skin material 4 is mounted to the seat back frame 11 the pad member 3 is assembled to each of the sides of the seat back frame 1. The end of the skin material 4 can be stopped by enveloping the pad member 3 and then winding the other end toward the back surface of the seat back frame 1, thereby hanging the hook 8 made of hard resin to the flange of the seat back frame 1.

The seat back B structured as described above can be assembled strongly with a simple structure as the seat back B having a bank which rises from the skin material 4 enveloping the pad member 3 higher than the surface position of a seating face while the seat back frame 1 is used as a base and the seating face is formed by the sheet resilient material 2. Further, by covering the seating face of the sheet resilient material 2 with the trim cover 5 from the front surface side, it is possible to suppress the air from the air conditioner in the vehicle from directly flowing from a back of the sitting passenger, thereby preventing the excessive effect of the air conditioner in the vehicle.

When the entire surface of the seating face is covered with the trim cover 5, it is preferable to use material having the breathability. In this case, it is possible to suppress the air of the air conditioner in the vehicle from directly acting on the back of the sitting passenger, and to keep the moderate breathability from the seating face. When the trim cover 5 does not have the breathability, a half-type trim cover for covering a substantially lower half of the seating face of the sheet resilient material 2 except the upper portion as described above can be used for air-conditioning from the seating face.

If a cover on which the pad material 5b is layered is stretched as the trim cover 5, even if the trim cover 5 hit a knee of a passenger on the rear seat, it is possible to prevent this from directly acting to a passenger on the front seat, and to buffer the hit against the passenger on the rear seat. Further, since the trim cover 5 is bent and deformed together with the sheet resilient material 2 by the pressure of the body of the sitting passenger, moderate cushion property is added, the supporting property of the back of the sitting passenger is excellent, and since the trim cover 5 is disposed at the front surface side, the design of the entire seat is enhanced.

The above-described embodiment has been explained based on the structure of the seat back B, based on the seat cushion frame 10 having the retainers 10a, 10b as shown in FIG. 1, if the sheet resilient material 11, the cushion pad 12 of the bank, the skin material 13 for enveloping the cushion pad 12 and the trim cover 14 stretched over the upper surface side of the sheet resilient material 11 are assembled, the present embodiment can also be applied to the assembling of the seat cushion C. With such a seat cushion C, the excessive effect of the air conditioner in the vehicle can be suppressed, and the cushion property can also be enhanced.

If the seat cushion C is mounted to bracket plates 16a, 16b slidably and uprightly mounted to and supported by slide rails 15a, 15b, and the bracket plates 16a, 16b are covered with exterior covers 17a, 17b, the longitudinal position can be adjusted as in the normal seat. If the one bracket plate 16b is provided with a reclining mechanism 18, the entire seat can be formed as a reclining seat.

What is claimed is:

1. A seat having a seat cushion and a seat back wherein the seat cushion comprises:

a first frame;

first support means made of a first sheet of breathable, resilient material;

first attachment means affixed to said first support means on a periphery thereof for attaching said first support means on said first frame;

a first trim cover disposed on a sitting side of said first support means;

first reinforcing means attached along a periphery of said first trim cover and adapted lord attaching said first trim cover to said first frame; and a plurality of first retainer means disposed around a periphery of said first frame for retaining said first attachment means and said first reinforcing means on said first frame, whereby said first support means and said trim cover arc stretched within said first frame.

2. A seat as set forth in claim 1 wherein the seat back comprises:

a second frame;

second support means made of a second sheet of breathable, resilient material;

second attachment means affixed to said second support means on a periphery thereof for attaching said second support means on said second frame;

a second trim cover disposed over a sitting side of said second support means;

second reinforcing means attached along a periphery of said second trim cover and adapted for attaching said second trim cover to said second frame; and a plurality of second retainer means disposed around a periphery of said second frame for retaining said second attachment means and said second reinforcing means on said second frame, whereby said second support means and said second trim cover are stretched within said second frame.

3. A seat as set forth in claim 2 wherein said first trim cover is formed of a material that is capable of bending and deforming together with said first support means in response to pressure from a body of a person sitting on said seat.

4. A seat as set forth in claim 3 wherein said second trim cover is formed of a material that is capable of bending and deforming together with said second support means in response to pressure from the body of a person sitting on said seat.

5. A seat as set forth in claim 2 wherein said first and second trim covers are formed of a breathable material.

6. A seat as set forth in claim 2 wherein said first trim cover comprises a sheet of padding material facing the sitting side of said first support means and a sheet of covering material layered on top of said padding material.

7. A seat as set forth in claim 2 wherein said first and second trim covers each comprises a sheet of padding material facing the sitting side of said first and second support means respectively, and a sheet of covering material layered on top of said padding material.

8. A seat as set forth in claim 2 wherein said first attachment means comprises a first rigid plate formed integrally with the first sheet of breathable, resilient material and said second attachment means comprises a second rigid plate formed integrally with the second sheet of breathable, resilient material, said first and second rigid plates each having a plurality of holes formed therein and spaced about the periphery thereof.

9. A seat as set forth in claim 8 wherein said first retainer means comprises a plurality of first pawls attached to said first frame and said second retainer means comprises a plurality of second pawls attached to said second frame, said first pawls being adapted on said first frame for engaging with the holes in said first rigid plate and said second pawls being adapted on said second frame for engaging with the holes in said second rigid plate.

10. A seat as set forth in claim 8 wherein said first reinforcing means comprises a first reinforcing cord having a plurality of holes formed therein and spaced about a periphery thereof, said second reinforcing means comprises a second reinforcing cord having a plurality of holes formed therein and spaced about a periphery thereof, said holes in said first reinforcing cord being aligned with the holes in said first rigid plate, and said holes in said second reinforcing cord being aligned with the holes in said second rigid plate.

11. A seat as set forth in claim 10 wherein said first retainer means comprises a plurality of first pawls attached to said first frame and said second retainer means comprises a plurality of second pawls attached to said second frame, said first pawls being adapted on said first frame for engaging with the holes in said first rigid plate and said first reinforcing cord and said second pawls being adapted on said second frame for engaging with the holes in said second rigid plate and said second reinforcing cord.

12. A seat as set forth in claim 1 wherein said first attachment means comprises a rigid plate formed integrally with the first sheet of breathable, resilient material, said rigid plate having a plurality of holes formed therein and spaced about the periphery thereof.

13. A seat as set forth in claim 12 wherein said first retainer means comprises a plurality of pawls attached to said first frame and adapted thereon for engaging with the holes in said rigid plate.

14. A seat as set forth in claim 12 wherein said first reinforcing means comprises a reinforcing cord having a plurality of holes formed therein and spaced about a periphery thereof, said holes being aligned with the holes in said rigid plate.

15. A seat as set forth in claim 14 wherein said first retainer means comprises a plurality of pawls attached to said first frame and adapted thereon for engaging with the holes in said rigid plate and said reinforcing cord.

* * * * *